US012645293B2

(12) United States Patent (10) Patent No.: US 12,645,293 B2
Murugappan et al. (45) Date of Patent: Jun. 2, 2026

(54) TECHNIQUES FOR UPDATING A REGISTRATION TRANSFORM BETWEEN AN EXTENDED-REALITY SYSTEM AND A COMPUTER-ASSISTED DEVICE

(71) Applicant: INTUITIVE SURGICAL OPERATIONS, INC., Sunnyvale, CA (US)

(72) Inventors: Sundar Murugappan, Danville, CA (US); Govinda Payyavula, Sunnyvale, CA (US); Guido Maria Re, Austin, TX (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 0 days.

(21) Appl. No.: 18/881,458

(22) PCT Filed: Aug. 31, 2023

(86) PCT No.: PCT/US2023/031601
§ 371 (c)(1),
(2) Date: Jan. 6, 2025

(87) PCT Pub. No.: WO2024/049942
PCT Pub. Date: Mar. 7, 2024

(65) Prior Publication Data
US 2025/0390171 A1 Dec. 25, 2025

Related U.S. Application Data

(60) Provisional application No. 63/403,573, filed on Sep. 2, 2022.

(51) Int. Cl.
*G06F 3/01* (2006.01)
*G06T 7/30* (2017.01)
*G06T 7/33* (2017.01)

(52) U.S. Cl.
CPC ................ *G06F 3/013* (2013.01); *G06T 7/30* (2017.01); *G06T 7/33* (2017.01)

(58) Field of Classification Search
CPC ...................................................... G06F 3/013
See application file for complete search history.

(56) References Cited

U.S. PATENT DOCUMENTS

2018/0078316 A1* 3/2018 Schaewe ................ A61B 34/20
2022/0265385 A1* 8/2022 Browd ................... A61B 90/39

FOREIGN PATENT DOCUMENTS

WO WO-2021202609 A1 10/2021

OTHER PUBLICATIONS

International Search Report and Written Opinion for Application No. PCT/US2023/031601, mailed Dec. 5, 2023, 11 pages.
(Continued)

*Primary Examiner* — Mihir K Rayan
(74) *Attorney, Agent, or Firm* — Artegis Law Group, LLP

(57) ABSTRACT

Techniques for updating the registration of an extended reality (XR) system with a computer-assisted device include the following. A control system communicably coupled to the computer-assisted device and to a sensor system is configured to: determine, based on sensor data, pose information of an operator portion of an operator during one or more interactions between the operator portion and a device portion of the computer-assisted device, determine pose information of the device portion during the one or more interactions, update a registration transform between the XR system and the computer-assisted device based on the pose information of the operator portion and the pose information of the device portion, and cause the XR system to render an image viewable by the operator using the updated registration transform.

35 Claims, 7 Drawing Sheets

(56)                          References Cited

OTHER PUBLICATIONS

Vertut, J., and Coiffet, P., "Robot Technology: Teleoperation and Robotics Evolution and Development," English translation, Prentice-Hall, Inc., Inglewood Cliffs, NJ, USA 1986, vol. 3A, 332 pages.

* cited by examiner

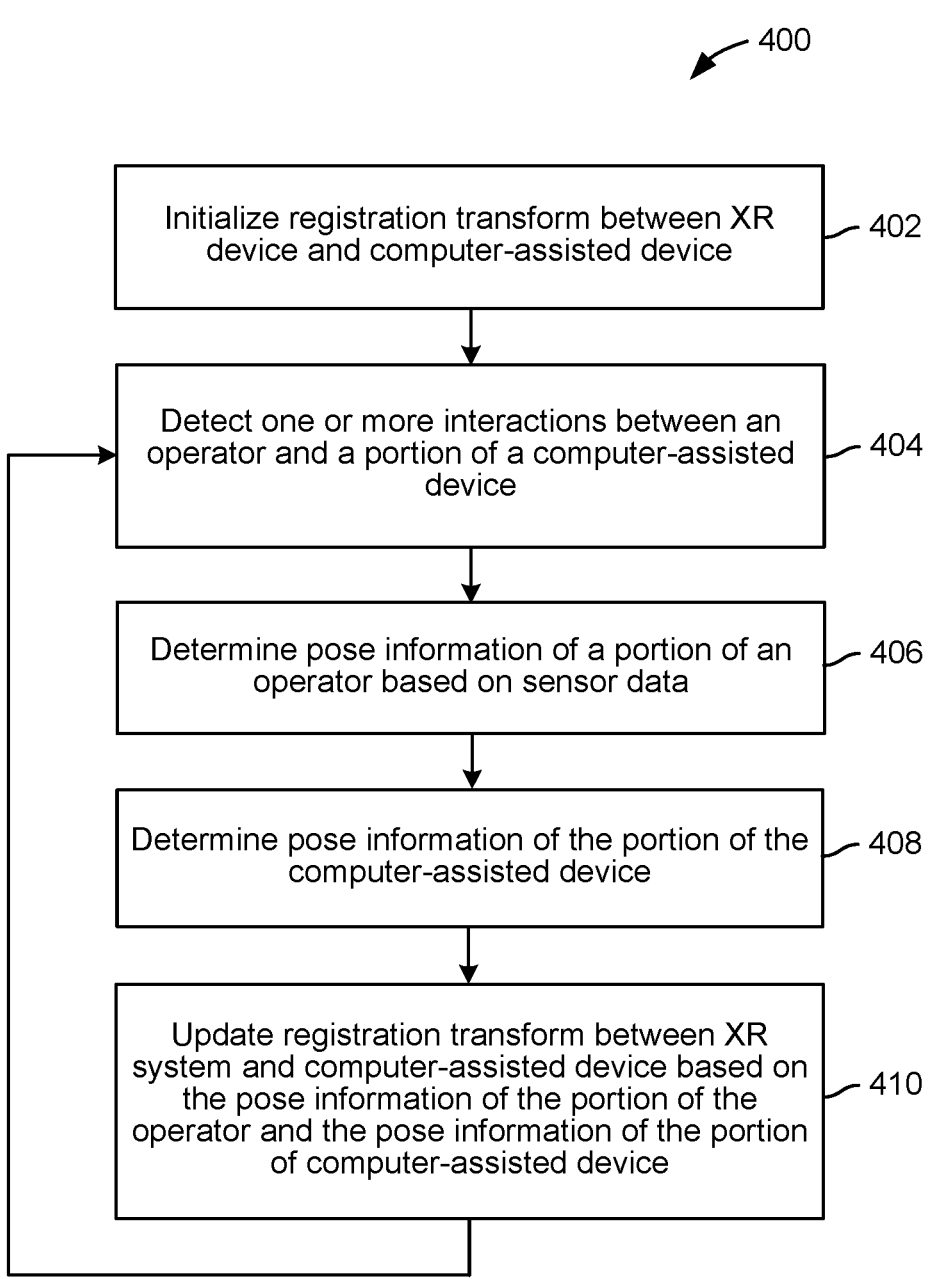

400

Initialize registration transform between XR device and computer-assisted device —— 402

Detect one or more interactions between an operator and a portion of a computer-assisted device —— 404

Determine pose information of a portion of an operator based on sensor data —— 406

Determine pose information of the portion of the computer-assisted device —— 408

Update registration transform between XR system and computer-assisted device based on the pose information of the portion of the operator and the pose information of the portion of computer-assisted device —— 410

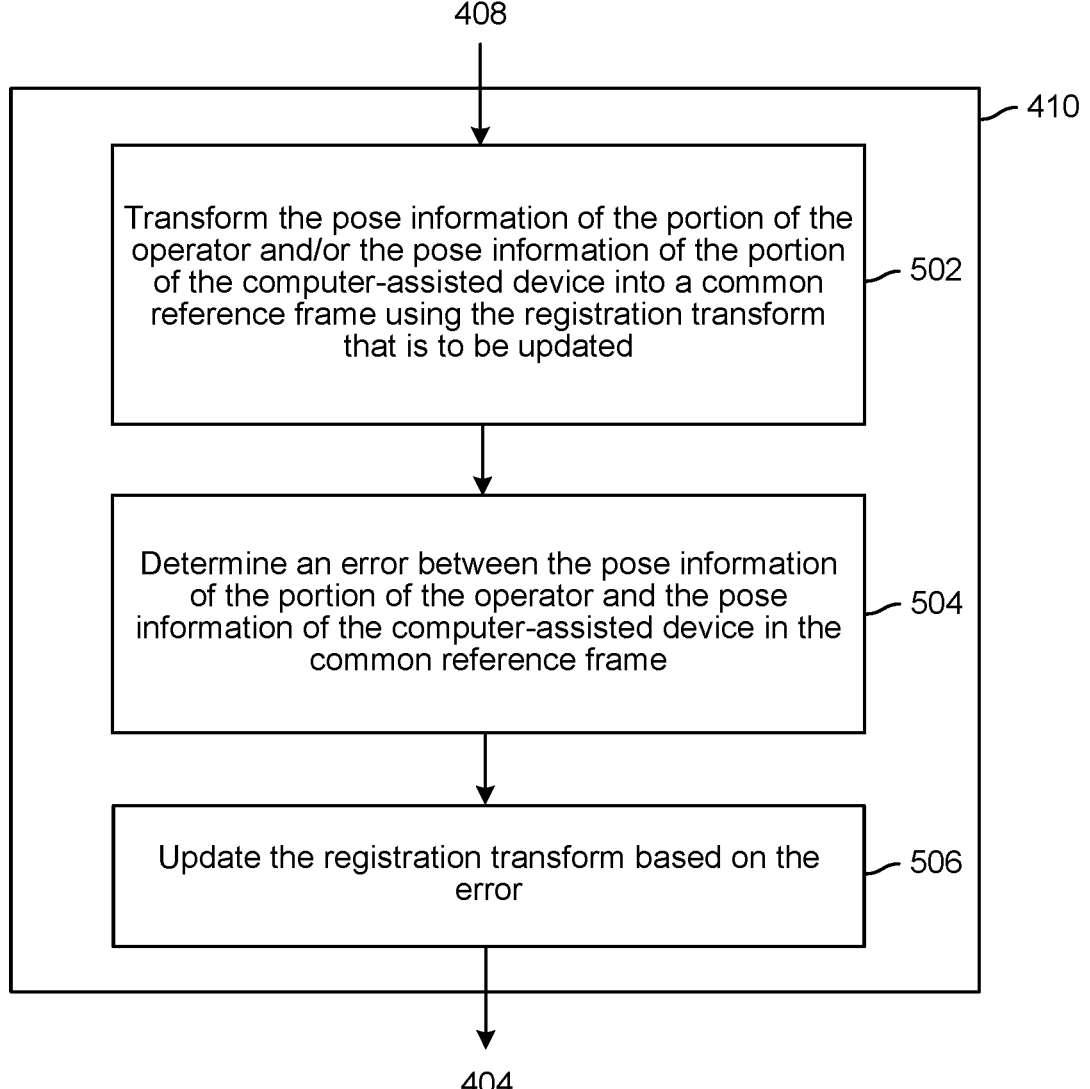

Transform the pose information of the portion of the operator and/or the pose information of the portion of the computer-assisted device into a common reference frame using the registration transform that is to be updated

502

Determine an error between the pose information of the portion of the operator and the pose information of the computer-assisted device in the common reference frame

504

Update the registration transform based on the error

TECHNIQUES FOR UPDATING A REGISTRATION TRANSFORM BETWEEN AN EXTENDED-REALITY SYSTEM AND A COMPUTER-ASSISTED DEVICE

RELATED APPLICATIONS

This application is a U.S. National Stage patent application of International Patent Application No. PCT/US2023/031601, filed Aug. 31, 2023, and claims the benefit to U.S. Provisional Application No. 63/403,573, filed Sep. 2, 2022, and entitled "Techniques For Updating A Registration Transform Between An Extended-Reality System And A Computer-Assisted Device," each of these related applications is incorporated by reference herein.

TECHNICAL FIELD

The present disclosure relates generally to electronic devices and more particularly relates to techniques for updating a registration transform between an extended-reality system and a computer-assisted device.

BACKGROUND

Computer-assisted electronic systems are being used more and more often. This is especially true in industrial, entertainment, educational, and other settings. As a medical example, the medical facilities of today have large arrays of computer-assisted devices being found in operating rooms, interventional suites, intensive care wards, emergency rooms, and/or the like. Many of these computer-assisted devices are moveable, and may be capable of autonomous or semi-autonomous motion. It is also known for personnel to control the motion and/or operation of moveable computer-assisted devices using one or more input devices located at a user control system. As a specific example of electronic systems comprising computer-assisted devices, minimally invasive, robotic telesurgical devices permit surgeons to operate on patients from bedside or remote locations. Telesurgery refers generally to surgery performed using surgical devices where the surgeon uses some form of remote control, such as a servomechanism, to manipulate surgical instrument movements rather than directly holding and moving the instruments by hand.

Extended reality (XR) systems are oftentimes used in conjunction with computer-assisted devices to perform tasks at worksites. Examples of XR systems include augmented reality (AR) devices and virtual reality (VR) devices. As used herein, AR refers to a view of the physical environment with an overlay of one or more computer-generated graphical elements, including mixed reality (MR) environments in which physical objects and computer-generated elements can interact. As used herein, VR refers to a virtual environment that includes computer-generated elements. For example, an XR system can present data about an operating environment of a computer-assisted device or guidance during operation of the computer-assisted device, among other things. In order to display XR content at appropriate positions and/or orientations relative to a computer-assisted device, a registration is determined between the XR system and the computer-assisted device. Registration establishes a geometric relationship between part or all of the XR system and part or all of the computer-assisted device. Such registration allows the position and orientation of the computer-assisted device to be determined relative to the XR system, when the XR system is used to provide XR content spatially relative to a position and/or orientation of the computer-assisted device.

Conventional methods for determining a registration between XR systems and objects in the environment such as a computer-assisted device can be less accurate. As a result, the XR system may display XR content at incorrect positions and/or orientations relative to the computer-assisted device.

Accordingly, improved techniques for registering XR systems with objects in the environment such as computer-assisted devices are desirable.

SUMMARY

Consistent with some embodiments, an electronic system includes a computer-assisted device, and a control system communicably coupled to the computer-assisted device and to a sensor system, the sensor system configured to capture sensor data about an environment external to the computer-assisted device. The control system is configured to: determine, based on the sensor data, pose information of an operator portion of an operator during one or more interactions between the operator portion and a device portion of the computer-assisted device, the pose information of the operator portion comprising at least one parameter selected from the group consisting of: a position of the operator portion during the one or more interactions and an orientation of the operator portion during the one or more interactions, determine pose information of the device portion during the one or more interactions, the pose information of the device portion comprising at least one parameter selected from the group consisting of: a position of the device portion during the one or more interactions and an orientation of the device portion during the one or more interactions, update a registration transform between an extended reality (XR) system and the computer-assisted device based on the pose information of the operator portion and the pose information of the device portion, and cause the XR system to render an image viewable by the operator using the updated registration transform.

Consistent with some embodiments, a method of operating an electronic system including a computer-assisted device and a control system communicably coupled to the computer-assisted device and to a sensor system, the sensor system configured to capture sensor data about an environment external to the computer-assisted device, and the method includes: determining, based on the sensor data, pose information of an operator portion of an operator during one or more interactions between the operator portion and a device portion of the computer-assisted device, the pose information of the operator portion comprising at least one parameter selected from the group consisting of: a position of the operator portion during the one or more interactions and an orientation of the operator portion during the one or more interactions; determining pose information of the device portion during the one or more interaction, the pose information of the device portion comprising at least one parameter selected from the group consisting of: a position of the device portion during the one or more interactions and an orientation of the device portion during the one or more interactions; updating a registration transform between an extended reality (XR) system and the computer-assisted device based on the pose information of the operator portion and the pose information of the device portion; and causing the XR system to render an image viewable by the operator using the updated registration transform.

Other embodiments include, without limitation, one or more non-transitory machine-readable media including a plurality of machine-readable instructions, which when executed by one or more processors, are adapted to cause the one or more processors to perform any of the methods disclosed herein.

The foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

FIG. 4 illustrates a simplified diagram of a method for updating a registration transform between an XR system and a computer-assisted device based on one or more operator interactions, according to various embodiments.

FIG. 5 illustrates a simplified diagram of a method for updating a registration transform between an XR system and a computer-assisted device, according to various embodiments.

DETAILED DESCRIPTION

Figure 1:
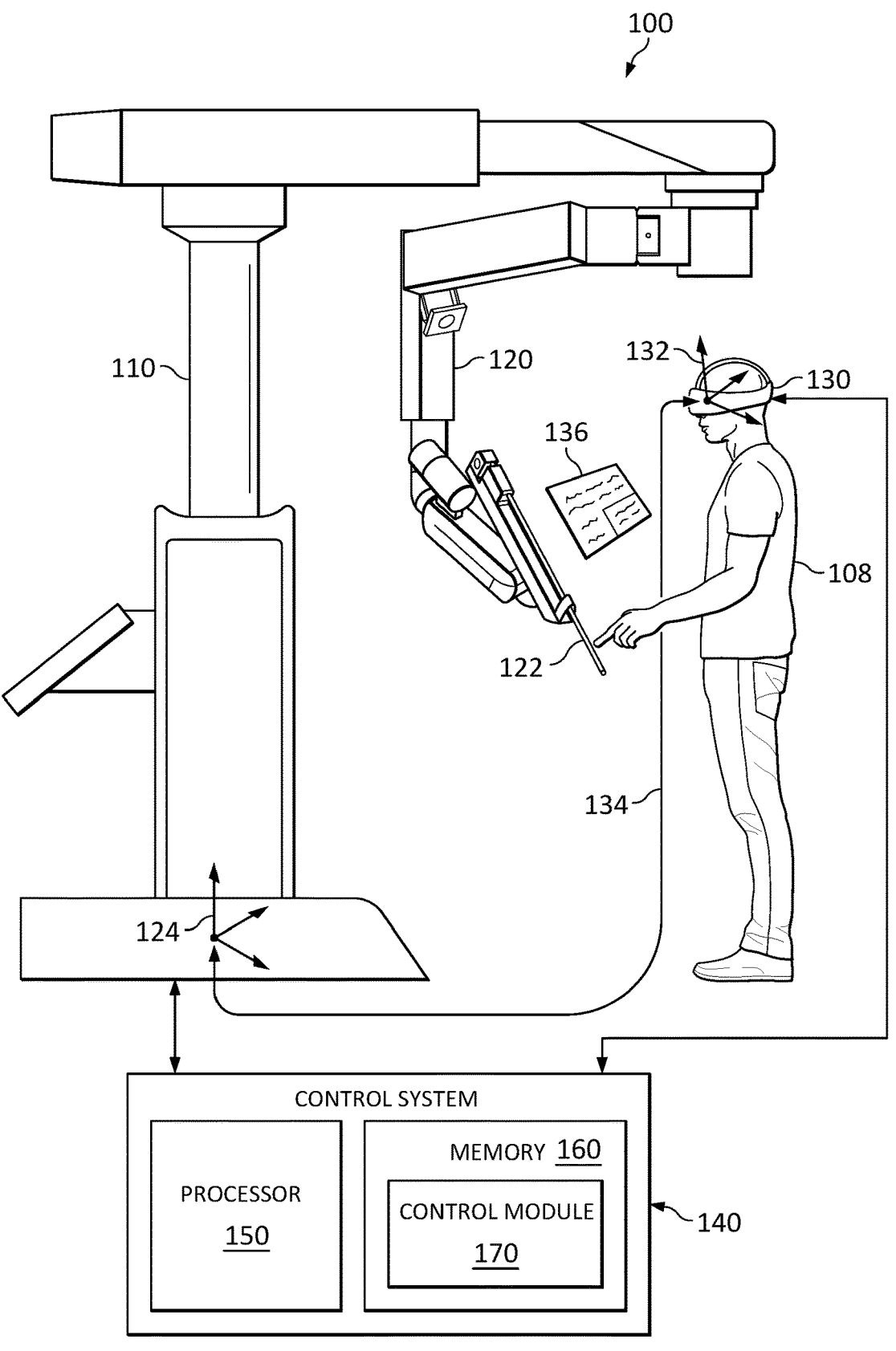
FIG. 1 is a simplified diagram including an example of a computer-assisted device and an XR system, according to various embodiments.

This description and the accompanying drawings that illustrate inventive aspects, embodiments, embodiments, or modules should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail in order not to obscure the invention. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Further, the terminology in this description is not intended to limit the invention. For example, spatially relative terms-such as "beneath", "below", "lower", "above", "upper", "proximal", "distal", and the like-may be used to describe one element's or feature's relationship to another element or feature as illustrated in the figures. These spatially relative terms are intended to encompass different positions (i.e., locations) and orientations (i.e., rotational placements) of the elements or their operation in addition to the position and orientation shown in the figures. For example, if the content of one of the figures is turned over, elements described as "below" or "beneath" other elements or features would then be "above" or "over" the other elements or features. Likewise, descriptions of movement along and around various axes include various special element positions and orientations. In addition, the singular forms "a", "an", and "the" are intended to include the plural forms as well, unless the context indicates otherwise. And, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electrically or mechanically directly coupled, or they may be indirectly coupled via one or more intermediate components.

Elements described in detail with reference to one embodiment, embodiment, or module may, whenever practical, be included in other embodiments, embodiments, or modules in which they are not specifically shown or described. For example, if an element is described in detail with reference to one embodiment and is not described with reference to a second embodiment, the element may nevertheless be claimed as included in the second embodiment. Thus, to avoid unnecessary repetition in the following description, one or more elements shown and described in association with one embodiment, embodiment, or application may be incorporated into other embodiments, embodiments, or aspects unless specifically described otherwise, unless the one or more elements would make an embodiment or embodiment non-functional, or unless two or more of the elements provide conflicting functions.

In some instances, well known methods, procedures, components, and circuits have not been described in detail so as not to unnecessarily obscure aspects of the embodiments.

This disclosure describes various elements (such as systems and devices, and portions of systems and devices) with examples in three-dimensional space. In such examples, the term "position" refers to the location of an element or a portion of an element in a three-dimensional space (e.g., three degrees of translational freedom along Cartesian x-, y-, and z-coordinates). Also in such examples, the term "orientation" refers to the rotational placement of an element or a portion of an element (three degrees of rotational freedom—e.g., roll, pitch, and yaw). Other examples may encompass other dimensional spaces, such as two-dimensional spaces. As used herein, the term "pose" refers to the position, the orientation, or the position and the orientation combined, of an element or a portion of an element. As used herein, and for an element or portion of an element, e.g. a device (e.g., a computer-assisted device or a repositionable arm), the term "proximal" for elements in a kinematic chain refers to a direction toward the base of the kinematic chain, and the term "distal" refers to a direction away from the base along the kinematic chain.

Aspects of this disclosure are described in reference to electronic systems and computer-assisted devices, which may include systems and devices that are teleoperated, remote-controlled, autonomous, semiautonomous, robotic, and/or the like. Further, aspects of this disclosure are described in terms of an embodiment using a medical system, such as the da Vinci® Surgical System commercialized by Intuitive Surgical, Inc. of Sunnyvale, California. Knowledgeable persons will understand, however, that inventive aspects disclosed herein may be embodied and implemented in various ways, including robotic and, if applicable, non-robotic embodiments. Embodiments described for da Vinci® Surgical Systems are merely exemplary, and are not to be considered as limiting the scope of the inventive aspects disclosed herein. For example, techniques described with reference to surgical instruments and surgical methods may be used in other contexts. Thus, the instruments, systems, and methods described herein may be used for humans, animals, portions of human or animal anatomy, industrial systems, general robotic, or teleoperational systems. As further examples, the instruments, systems, and methods described herein may be used for nonmedical purposes including industrial uses, general robotic uses, sensing or manipulating non-tissue work pieces, cosmetic improvements, imaging of human or animal anatomy, gathering data from human or animal anatomy, setting up or taking down systems, training medical or non-medical personnel, and/or the like. Additional example applications include use for procedures on tissue removed from human or animal anatomies (with or without return to a human or animal anatomy) and for procedures on human or animal cadavers. Further, these techniques can also be used for medical treatment or diagnosis procedures that include, or do not include, surgical aspects.

System Overview

FIG. 1 is a simplified diagram of an electronic system 100, according to various embodiments. As shown, electronic system 100 includes, without limitation, a computer-assisted device 110 and an extended reality (XR) system 130. Computer-assisted device 110 includes a repositionable structure, the repositionable structure having a repositionable arm 120, such as a manipulator arm, configured to support an instrument 122. Although one repositionable arm 120 supporting one instrument 122 is shown for illustrative purposes, the repositionable structure of a computer-assisted device can include any suitable number of repositionable arms, and each repositionable arm can be configured to support one instrument, or a plurality of instruments.

In some examples, instrument 122 is an imaging instrument, a manipulation instrument such as graspers or scissors, a fastening instrument such as a stapler, an irrigation instrument, a suction instrument, an energy application instrument, or any other appropriate instrument. In some examples, instrument 122 is an imaging instrument such as a monoscopic or stereoscopic camera, a still or video camera, an endoscope, a hyperspectral device, an infrared or ultrasonic device, an ultrasonic device, a fluoroscopic device, and/or the like. In some examples, instrument 122 is a medical instrument, such as a medical endoscope, forceps, clip appliers, a gripper, a retractor, a cautery instrument, a suction instrument, a suturing device, a stapling device, a cutting device, and/or the like. In some examples, instrument 122 includes an end effector capable of performing one or multiple tasks, such as grasping a material (e.g., tissue of a patient in a medical example) located in a workspace and delivering energy to the grasped material. In some examples, the energy includes ultrasonic, radio frequency, electrical, magnetic, thermal, light, and/or other types of energy. In some examples, the repositionable arm 120 includes one or more joints and the instrument 122. In some examples, instrument 122 is, during use, inserted into a workspace (e.g., anatomy of a patient or cadaver, a veterinary subject, an anatomical model, and/or the like in some medical examples) through a cannula, access port, and/or the like to perform a procedure.

In some examples, computer-assisted device 110 is a teleoperated device. In some medical examples, the teleoperated device is a teleoperated medical device, such as a telesurgical device, that can be found in an operating room and/or an interventional suite. In some examples, computer-assisted device 110 is a follower device that is teleoperated by being controlled by one or more leader devices (not shown), such as one or more input devices designed to be contacted and manipulated by an operator (not shown). The one or more input devices may be mechanically grounded (kinematically grounded by mechanical structures) or mechanically ungrounded (not kinematically grounded by mechanical structures). Systems that include a leader device and a follower device are referred to as leader-follower systems, and also sometimes referred to as master-slave systems. When computer-assisted device 110 is a teleoperated follower device comprising the repositionable arm 120 and/or an instrument 122 supported by the repositionable arm and is controlled to move and articulate in response to manipulation of leader device(s) by an operator, and computer-assisted device 110 "follows" through teleoperation the leader input device(s). The operator is thus able to perform tasks at a worksite using the repositionable arm 120 and/or instrument 122.

In some embodiments, XR system 130 is an augmented reality (AR) device or a virtual reality (VR) device. XR system 130 is described in greater detail below in conjunction with FIG. 2. In some examples, XR system 130 is used in conjunction with computer-assisted device 110 to perform tasks at a worksite. For example, XR system 130 could be used to present instructional content on how to operate computer-assisted device 110. As another example, XR system 130 could be used to present content that provides guidance during operation of computer-assisted device 110. Illustratively, XR system 130 has displayed AR content 136 next to repositionable arm 120 of computer-assisted device 110. AR content 136 can be provided in any manner appropriate for visual AR content, such as a visual overlay. In order for XR content (e.g., AR content 136) that is presented by XR system 130 to be displayed at appropriate positions and orientations relative to computer-assisted device 110, a registration transform 134 between XR system 130 and computer-assisted device 110 is established. Registration transform 134 provides a geometric relationship between XR system 130 and computer-assisted device 110. Using registration transform 134, XR content to be displayed relative to a portion of computer-assisted device 110 is displayed at or near a position in reference frame 132 of XR system 130 that is determined from a position of the portion of computer-assisted device 110 in reference frame 124 of computer-assisted device 110. For example, to display AR content 136, registration transform 134 is used to map a position (and optionally an orientation) of the portion of computer-assisted device 110 in reference frame 124 of computer-assisted device 110 to a corresponding position (and optionally orientation) in reference frame 132 of XR system 130. AR content 136 can be displayed near the corresponding position of the portion of the repositionable arm 120 in reference frame 132. The position of repositionable arm 120 in reference frame 124 of computer-assisted device 110 is determined using kinematics or in any other technically feasible manner (e.g., using sensors such as a gyroscope, an IMU, shape sensors, etc. that track the position of repositionable arm 120).

Illustratively, reference frame 124 is a base reference frame of computer-assisted device 110. In some examples, reference frame 124 has an origin located at a central point on a base of computer-assisted device 110 and is aligned with one or more major axes of computer-assisted device 110. In some examples, a central point on the base of computer-assisted device 110 is on a level, planar surface on which computer-assisted device 110 is wheeled, slid, and/or otherwise repositioned. In some examples, a z-axis of reference frame 124 corresponds to a vertical up direction. As shown, reference frame 132 is a base reference frame of XR system 130. In some examples, reference frame 132 has an origin located at a point within XR system 130 and is oriented in any technically feasible manner. In some examples, a z-axis of reference frame 124 corresponds to a direction of view of XR system 130, a y-axis of reference frame 124 corresponds to the view up direction, and an x-axis of reference frame 124 is orthogonal to both the z- and y-axes of reference frame 124.

In some examples, the geometric relationship between reference frame 124 and reference frame 132 is characterized using a 6 degrees of freedom (6 DOF) registration transform 134. For example, the registration transform 134 can include a 3 degrees of freedom (DOF) rotation portion and a 3 DOF translation portion. In such cases, the rotation portion can be represented with a 3×3 matrix describing the 3-dimensional rotational difference between reference frame 124 and reference frame 132. In some examples, the rotation portion describes rotation about the three axes of reference frame 124. In some examples, the three axes correspond to x, y, and z axes; roll, pitch, and yaw axes, and/or the like. In some examples, the rotation portion is represented using angle-axis, quaternion, and/or similar equivalent notations. In some examples, the translation portion can be represented by a 3×1 vector describing the 3-dimensional displacement between reference frame 124 and reference frame 132.

As shown, a control system 140 is provided external to computer-assisted device 110 and XR system 130, and control system 140 communicates with both computer-assisted device 110 and XR system 130. In other embodiments, control system 140 is part of a computer-assisted device 110 or in XR system 130. In some embodiments, control system 140 generates XR content that is presented by XR system 130. In some embodiments, control system 140 also determines or provides control signals to computer-assisted device 110 to control movement of repositionable arm 120 and/or instrument 122 based on the received information and operator input. In some embodiments, control system 140 supports one or more wired communication protocols, (e.g., Ethernet, USB, and/or the like) and/or one or more wireless communication protocols (e.g., Bluetooth, IrDA, HomeRF, IEEE 1002.11, DECT, Wireless Telemetry, and/or the like).

Control system 140 is implemented on one or more computing systems. As shown, control system 140 includes a processor 150 and a memory 160 storing a control module 170. In some embodiments, control system 140 includes one or more processors that execute the control module 170, non-persistent storage (e.g., volatile memory, such as random access memory (RAM), cache memory), persistent storage (e.g., a hard disk, an optical drive such as a compact disk (CD) drive or digital versatile disk (DVD) drive, a flash memory, etc.), a communication interface (e.g., Bluetooth interface, infrared interface, network interface, optical interface, etc.), and numerous other elements and functionalities. Although described herein primarily with respect to control module 170 that runs on control system 140, the functionality of control module 170 can be implemented in any technically feasible software and/or hardware, including partially or entirely within XR system 130, within another computing system, within a cloud computing system, etc.

Each of the one or more processors of control system 140 is an integrated circuit for processing instructions. For example, the one or more processors can be one or more cores or micro-cores of a processor, a central processing unit (CPU), a microprocessor, a field-programmable gate array (FPGA), an application-specific integrated circuit (ASIC), a digital signal processor (DSP), a graphics processing unit (GPU), a tensor processing unit (TPU), and/or the like. In some examples, control system 140 also includes one or more input devices (not shown), such as a touchscreen, keyboard, mouse, microphone, touchpad, electronic pen, or any other type of input device.

A communication interface of control system 140 can include an integrated circuit for connecting the computing system to a network (not shown) (e.g., a local area network (LAN), a wide area network (WAN) such as the Internet, mobile network, or any other type of network) and/or to another device, such as another computing system.

In some examples, control system 140 further includes one or more output devices (not shown), such as a display device (e.g., a liquid crystal display (LCD), a plasma display, touchscreen, organic LED display (OLED), projector, or other display device), a printer, a speaker, external storage, or any other output device. One or more of the output devices can be the same or different from the input device(s). Many different types of computing systems exist, and the aforementioned input and output device(s) can take other forms.

In some embodiments, control system 140 is connected to or be a part of a network. The network can include multiple nodes. Control system 140 is implemented on one node or on a group of nodes. By way of example, control system 140 is implemented on a node of a distributed system that is connected to other nodes. By way of another example, control system 140 is implemented on a distributed computing system having multiple nodes, where different functions and/or components of control system 140 are located on a different node within the distributed computing system. Further, one or more elements of the aforementioned control system 140 can be located at a remote location and connected to the other elements over a network.

Software instructions in the form of computer readable program code to perform embodiments of the disclosure is stored, in whole or in part, temporarily or permanently, on a non-transitory computer readable medium such as a CD, DVD, storage device, a diskette, a tape, flash memory, physical memory, or any other computer readable storage medium. Specifically, the software instructions can correspond to computer readable program code that, when executed by a processor(s) (e.g., processor 150), is configured to perform some embodiments of the methods described herein.

Some embodiments include one or more components of a teleoperated medical system such as a da Vinci® Surgical System, commercialized by Intuitive Surgical, Inc. of Sunnyvale, California, U.S.A. Embodiments on da Vinci® Surgical Systems are merely examples and are not to be considered as limiting the scope of the features disclosed herein. For example, different types of teleoperated systems having computer-assisted devices comprising follower devices configured to be placed at worksites can use the features described herein. Further, non-teleoperated systems can also make use of features described herein.

Figure 2:
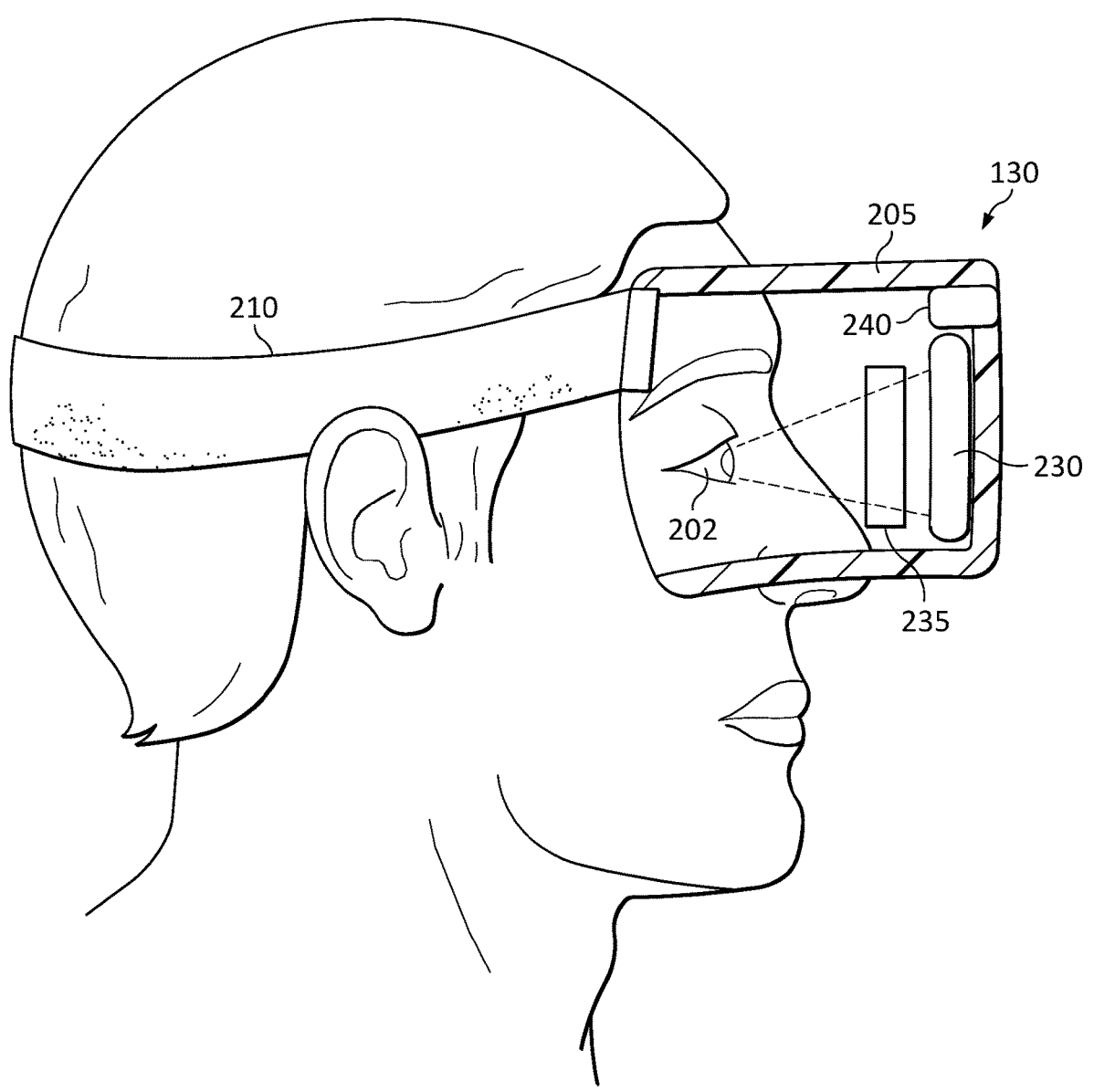
FIG. 2 is a perspective view illustrating an extended reality (XR) system, according to various embodiments.

FIG. 2 is a perspective view illustrating head-mounted XR system 130 in greater detail, according to various embodiments. As shown in FIG. 2, XR system 130 includes a body 205 and a head mount 210. Body 205 includes one or more electronic display elements of an electronic display 230. Body 205 also includes a sensor system 240 that acquires sensor data associated with the physical environment external to XR system 130, which may also be external to any objects (such as computer-assisted devices) in the physical environment. Sensor system 240 can include any technically feasible sensor or sensors, such monoscopic and stereoscopic optical systems, ultrasonic systems, depth cameras such as cameras using time-of-flight sensors, LIDAR (Light Detection and Ranging) sensors, stereo RGB (red, green, blue) sensors, RGB-D depth-sensors, etc. Although FIG. 2 shows a head-mounted XR system, other XR systems may be used in other embodiments. Examples of other types of XR systems include appropriately configured tablets, smart-phones, projectors, etc. Although sensor system 240 is shown in FIG. 2 as included in XR system 130, a sensor system used to provide sensor data associated with the physical environment external to the XR system 130 (which can also include data external to one or more objects in the physical environment) can be provided in any appropriate location. For example, part or all of such a sensor system can be alternatively or additionally located elsewhere in the physical environment, including mounted on walls, ceilings, or stands, or coupled to a computer-assisted device.

In addition, body 205 includes electronic display 230 and an optics block 235 that together provide image light to a target location of body 205 where an eye 202 of an operator may be positioned. In some examples, body 205 also includes one or more other sensors, such as one or more imaging devices (e.g., one or more imaging sensors for tracking eye 220), accelerometers, and/or angular velocity sensors (which may be part of inertial measurement units (IMUs)), position sensors, and/or other sensors.

Electronic display 230 is configured to display images viewable by the operator. In various embodiments, electronic display 230 includes a single electronic display or multiple electronic displays (e.g., a display for each eye of an operator). Examples of the electronic display 230 include: a liquid crystal display (LCD), an organic light emitting diode (OLED) display, an active-matrix organic light-emitting diode display (AMOLED), a QOLED, a QLED, some other display, or some combination thereof. Optics block 235 includes optical elements that can be used to adjust an orientation of image light emitted from electronic display 230 such that electronic display 230 appears at particular virtual image distances from the operator.

In some embodiments, XR system 130 operates as an AR device that presents computer-generated media to an operator using electronic display 230 that augments views of a physical, real-world environment visible to the operator through electronic display 230. Examples of computer-generated media presented by XR system 130 include one or more images, video, audio, or some combination thereof. Alternatively or additionally, in some embodiments, XR system 130 operates as a VR device, or some combination of an AR device and a VR device, such as a device that permits switching between AR and VR environments. As described, MR content provides an AR environment in which physical objects and computer-generated elements can interact, and VR content provides a virtual environment that includes computer-generated elements. In the case of a VR device, sensor system 240 can capture images of the physical environment and display the captured images along with computer-generated elements, such as AR content 136, which is also sometimes referred to as video see through. Examples of commercially available AR devices include Microsoft HoloLens®, Google Glass®, and Meta 2®. Examples of commercially available MR devices include Microsoft HoloLens 2®, Samsung Odyssey+®, HP Reverb®, and Oculus Quest 2®. Examples of commercially available VR devices include Oculus Rift®, Samsung Gear VR®, HTC Vive®, and Google Daydream View®.

It should be noted that FIG. 2 merely shows an example configuration of an XR system. In some embodiments, the techniques for updating a registration transform between an XR system and a computer-assisted device that are disclosed herein are usable with other configurations and/or types of XR systems. The other configurations and/or types of XR systems include head-mounted XR systems, hand-held XR systems, and XR systems that are placed in the environment, among other things. Examples of alternative configurations and/or types of XR systems include optical head-mounted displays (HMDs), mobile devices (e.g., mobile phones, tablet computers, etc.), fully immersive projection systems, etc.

Updating the Registration Transform Between an Extended-Reality System and a Computer-Assisted Device The registration between an XR system and a computer-assisted device can be updated based on determined a relationship between pose information of a portion of an operator and pose information of a portion of the computer-assisted device during an interaction between the operator, who is using the XR system, and the computer-assisted device.

Figure 3:
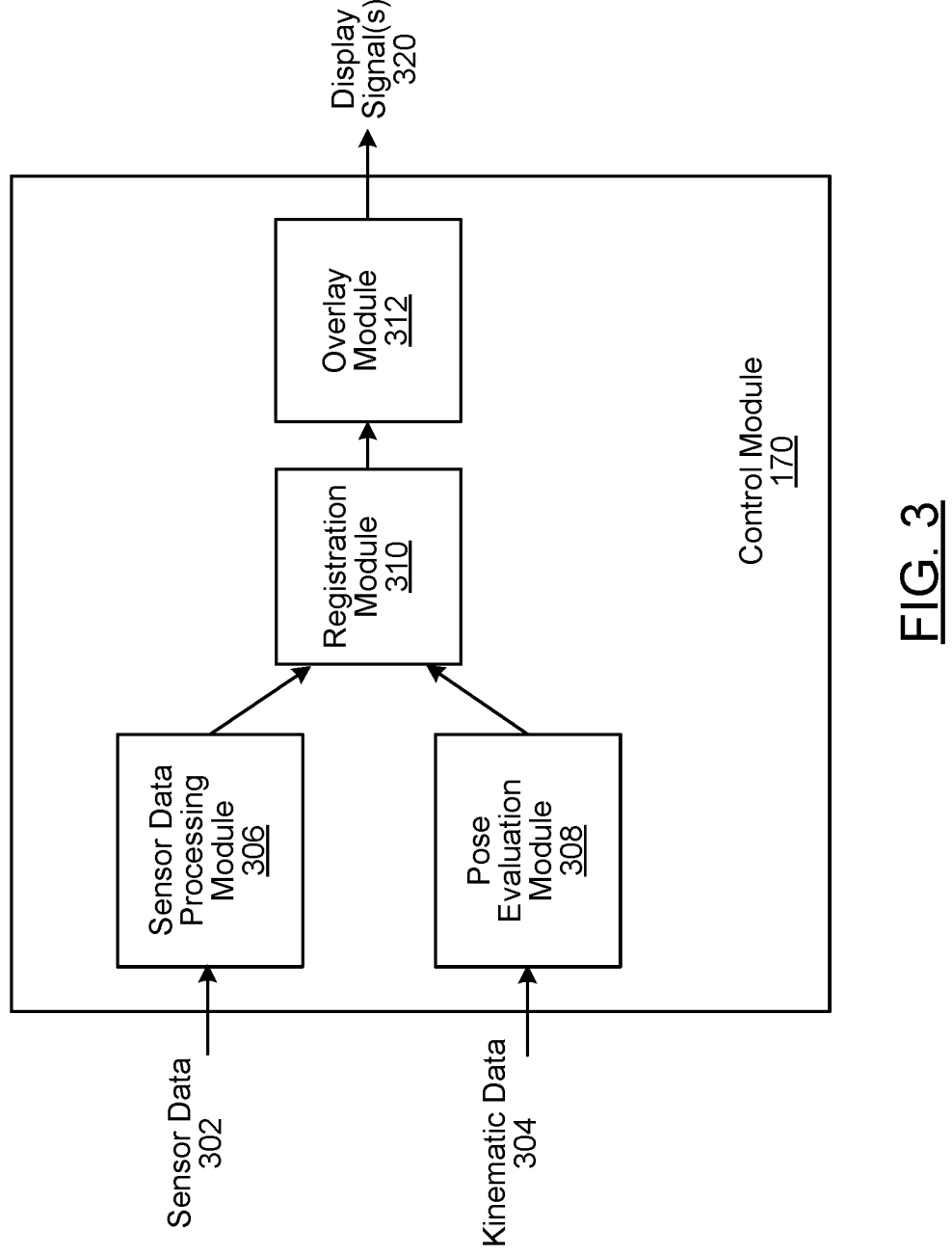
FIG. 3 illustrates the control module of FIG. 1 in greater detail, according to various embodiments.

FIG. 3 illustrates control module 170 of FIG. 1 in greater detail, according to various embodiments. As shown, control module 170 includes, without limitation, a sensor data processing module 306, a kinematics evaluation module 308, a registration module 310, an overlay module 312, and a compositing module 316. During operation, sensor data processing module 306 receives sensor data 302 that is acquired by a sensor system (e.g., sensor system 240) and determines pose information of a portion of an operator that interacts with a portion of a computer-assisted device (e.g., computer-assisted device 110) during the operator interaction. In some embodiments, the pose information of the operator includes one or more position parameters, or one or more position parameters and one or more orientation parameters. In some embodiments, the pose information of the portion of the operator is determined using a human pose estimation technique, as discussed in greater detail below in conjunction with FIG. 4. Alternatively or additionally, sensor data processing module 306 can determine pose information of an extension of a portion of the operator, such as an object of known dimension (e.g., a cable, tool, etc.) that the operator is holding.

During operation, pose evaluation module 308 receives kinematic data 304 associated with the joints and/or links of a repositionable structure of a computer-assisted device, such as computer-assisted device 110, and determines pose information of a portion of the computer-assisted. In some embodiments, the pose information of the portion of the computer-assisted device includes one or more position parameters, or one or more position parameters and one or more orientation parameters. This pose information of the portion of the repositionable structure is during the interaction between the portion of the operator and the portion of the repositionable structure. In some embodiments, kinematic data 304 can be acquired by joint sensors that transmit positions and orientations of joints of the repositionable structure to record movements thereof, shape sensors that monitor the shape of an optical fiber to determine the pose of the repositionable structure located at one end of the optical fiber relative to a frame of reference located at the other end of the fiber, and/or in any other technically feasible manner. When a portion of the operator (an "operator portion") interacts with a portion of a repositionable structure of computer-assisted device 110 (a "device portion"), pose evaluation module 308 uses kinematic data 304 and one or more kinematic models and/or three-dimensional (3D) models of the repositionable structure to determine pose information of the portion of the repositionable structure. In some embodiments, kinematic data 304 is synchronized with sensor data 302 so that comparisons can be made between pose information that is determined using the sensor data 302 and pose information that is determined using the kinematic data 304 and corresponds to the same point(s) in time. Although discussed herein primarily with respect to examples in which the portion of the computer-assisted device is a portion of a repositionable structure, in some embodiments, techniques disclosed herein can be applied to cases where the portion of the computer-assisted device is another portion of the computer-assisted device or is a portion of a computer-assisted device that does not include a repositionable structure. When a portion of the operator interacts with a portion of a computer-assisted device other than a repositionable structure (e.g., a helm, handlebars, a base, etc. of a computer-assisted device), pose information of the portion of the computer-assisted device can be determined based on a pose of the overall computer-assisted device and a known position and orientation of the portion relative to the overall computer-assisted device.

During operation, registration module 310 determines a registration transform between XR system 130 and computer-assisted device 110. The registration transform can be between XR system 130 and any portion of the computer-assisted device 110. Internal transforms between portions of the computer-assisted device 110 can be determined using the known or sensed geometries of the computer-assisted device 110. Thus, when a registration transform is between XR system 130 and a part of computer-assisted device 110 is known, transforms defining the relative positions and/or orientations can be determined between XR system 130 and other part(s) of computer-assisted device 110 using these internal transforms. In some embodiments, registration module 310 updates the current registration transform based on operator interactions with computer-assisted device 110. In some embodiments, registration module 310 (i) determines an initial registration transform according to appropriate technique(s), and (ii) updates the current registration transform (which would initially be the initial registration transform) based on one or more operator interactions with computer-assisted device 110. In some examples, determining the initial registration transform includes prompting an operator to look at, touch, and/or move one or more portions of computer-assisted device 110. As used herein, a prompt can include any suitable visual and/or audio indication of operator action(s) to perform, such as a graphic, textual message, flashing light, audio instruction, etc. For example, the operator can be prompted to look at and/or interact with a particular portion of computer-assisted device 110. As another example, the operator can be prompted to perform a set of interactions and/or a complex operator interaction with a portion of computer-assisted device 110, such as moving a manipulator through a range of movements, while looking at the portion of computer-assisted device 110. Imaging devices in sensor system 240 of XR system 130 capture images of the one or more portions of computer-assisted device 110 as the operator looks, touches, and/or moves the one or more portions. The initial registration transform is determined by computing initial value(s) for registration transform 134 between reference frame 124 of computer-assisted device 110 and reference frame 132 of XR system 130 based on the position and orientation of computer-assisted device 110, which can be determined using a model target-based technique in some examples. For example, the model target-based technique can use a photogrammetry technique to reconstruct a 3D model of computer-assisted device 110 from image data, and then match the reconstructed model to a predefined model of computer-assisted device 110 in order to determine the position and orientation of computer-assisted device 110. In some other examples, determining the initial registration transform includes capturing images of one or more portions of the computer-assisted device on which fiducial markers (e.g., QR codes, images, markers that encode data, etc.) have been placed. In such cases, the initial registration transform can be computed partially or entirely based on the positions and/or orientations of the fiducial markers in the captured images. In some examples, the computer vision-based and marker-based registration techniques described above can be combined to determine an initial registration transform. In some examples, any other technically feasible technique can be used to determine an initial registration transform.

An initial registration transform determined using model target-based, marker-based, and/or other registration techniques can be inaccurate. What is considered inaccurate can depend on the type of XR content to be displayed, the operational context of the computer-assisted device, and/or the operational context of the XR system. For example, for typical human interactions, an operator may perceive XR content that is overlaid to be aligned linearly or angularly particular features (such as when an overlay depicting a portion of a computer-assisted device is overlaid directly on that portion of the computer-assisted device) to be displayed with inaccurate registration when the XR content is offset from a desired position by approximately 1 centimeter or more and/or 5 degrees or more in any axis of rotation at an effective distance of 1 meter away from the eyes of the operator. As a further example, XR content overlaid for eye surgery or fine crafting may be considered to be displayed with inaccurate registration at much smaller deviations. As another example, an operator may perceive "floating" XR content that is not overlaid to be aligned over any specific object or feature of the object (such as offset on the side of a computer-assisted device) to be displayed with accurate registration even if the XR content is misaligned angularly or linearly by more than a few centimeters at an effective distance of 1 meter away from the operator (assuming that the XR content does not impinge into the visual space of the computer-assisted device). As another example, operators may consider XR content to be inaccurately registered at smaller deviations for head-mounted devices than handheld devices (e.g., handheld screens or tablets). Further, initial registrations that are accurate initially may become more inaccurate over time due to drift, movement, sensor inaccuracies, etc. When the initial registration transform is inaccurate, XR system 130 can display XR content at positions and/or orientations relative to computer-assisted device 110 that are perceived as incorrect. To improve the registration accuracy, registration module 310 updates the initial registration transform based on operator interactions with computer-assisted device 110.

When one or more portions of the operator interact with one or more portions of a repositionable structure of computer-assisted device 110, one or more points and/or regions of interaction are determined in reference frame 132 of XR system 130. Each point or region of interaction can be an actual point or region of contact between a portion of the operator or extension thereof (gloves, shoes, cable, pointer stick, etc.) and a portion of the computer-assisted device, or an estimate thereof. Each point or region of interaction is determined in both reference frame 132 of XR system 130 and reference frame 124 of computer-assisted device 110. A point or region of interaction can be determined in reference frame 132 using a human pose estimation technique, described in greater detail below, and sensor data that is acquired by sensor system 240 of XR system 130. A point or region of interaction can be determined in reference frame 124 of computer-assisted device 110 either (1) using kinematics and known joint locations of a repositionable structure of computer-assisted device 110 when the operator interacts with a portion of the repositionable structure, or (2) based on a pose of some other portion of the computer-assisted device or of the overall computer-assisted device 110, and a known position and orientation of the portion relative to the overall computer-assisted device 110, when the operators interacts with a portion of the computer-assisted device 110 other than the repositionable structure. Alternatively, point(s) and/or region(s) of interaction with the repositionable structure can be determined using any technically feasible techniques, including non-kinematics techniques (e.g., sensors that directly track motion of the portion(s) of the repositionable structure). The determined point(s) and/or region(s) of interaction are then mapped to a common reference frame (e.g., reference frame 124 of computer-assisted device 110, reference frame 132 of XR system 130, etc.) using the registration transform. An error is determined between the point(s) and/or region(s) of interaction in the common reference frame. Then, an update to the initial registration transform is computed based on the error, as discussed in greater detail below in conjunction with FIGS. 4-5. For example, assume the interaction involves the operator pressing a mechanical button on the repositionable structure of computer-assisted device 110. In such a case, the position of a tip of the finger of the operator that contacts the button in reference frame 132 of XR system 130, corresponding to a position of the button, is detected using human pose estimation technique based on images acquired by sensor system 240. Then, the registration transform is applied to map the position (e.g., pose information) of the finger/button in reference frame 132 of XR system 130 to a position in reference frame 124 of computer-assisted device 110. Specifically, an inverse of the registration transform can be used to map the position of the finger/button in reference frame 132 of XR system 130 to the position in reference frame 124 of computer-assisted device 110. Thereafter, the position in reference frame 124 of computer-assisted device 110 is compared with a position (e.g., pose information) of the button in reference frame 124 that is determined using kinematics, or in any other technically feasible manner (e.g., using sensors such as a gyroscope, an IMU, shape sensors, etc.). An error between the positions is then computed and used to determine a gradient descent update to the initial registration. Alternatively, the registration transform is applied to map the position in reference frame of 124 of computer-assisted device 110 to a position in reference frame 132 of XR system 130, and the error is computed in reference frame 132 to determine the gradient descent update.

During operation, overlay module 312 generates XR content. As described, XR content includes AR, MR, and/or VR content in some embodiments. Any suitable XR content, such as the AR content 136 described above in conjunction with FIG. 1, is generated. For example, the XR content can include instructional content on how to operate a computer-assisted device. As another example, the XR content can include content that provides data related to a procedure being performed by the computer-assisted device, such as previously captured images, models, real-time captured images, data about the functioning of the computer-assisted device, communications from others, tutorials or videos, guidance during operation of the computer-assisted device, etc. To display XR content spatially relative to a portion of computer-assisted device 110, overlay module 312 applies registration transform 134 to map a known position of the portion of computer-assisted device 110 in reference frame 124 of computer-assisted device 110 to a corresponding position in reference frame 132 of XR system 130. Then, overlay module 312 generates XR content for display at or near the corresponding position in reference frame 132. The position of the portion of computer-assisted device 110 in reference frame 124 is either known (e.g., a known position of a helm, handle bar, base, or other portion that is not part of the repositionable structure of computer-assisted device 110), determined using kinematics, or determined in any other technically feasible manner (e.g., using sensors such as a gyroscope, an IMU, shape sensors, etc. that track the position of the portion of computer-assisted device 110). Thereafter, overlay module 312 outputs a display signal 320 that is used to display the XR content.

In the AR case, overlay module 312 generates content for display to an operator to enhance a view of the physical environment. In the VR case, the content generated by overlay module 312 is combined with image data depicting the physical environment to generate a composite image for display to the operator. The image data is captured by one or more imaging devices in sensor system 240, or elsewhere. In addition, display signal 320 is generated based on the composite image.

FIG. 4 illustrates a simplified diagram of a method for updating a registration transform between an XR system and a computer-assisted device based on one or more operator interactions, according to various embodiments. One or more of the processes 402-410 of method 400 can be implemented, at least in part, in the form of executable code stored on non-transitory, tangible, machine readable media that when executed by one or more processors (e.g., the processor 150 in control system 140) cause the one or more processors to perform one or more of the processes 402-410. In some embodiments, method 400 can be performed by one or more modules, such as control module 170. In some embodiments, method 400 can include additional processes, which are not shown. In some embodiments, one or more of the processes 402-410 can be performed, at least in part, by one or more of the modules of control system 140.

As shown, method 400 begins at process 402, where a registration transform between an XR system and a computer-assisted device is initially determined. In some embodiments, the initial registration transform is determined according to any technically feasible technique. In some examples, determining the initial registration transform includes prompting an operator to look at, touch, and/or move one or more portions of the computer-assisted device. In some examples, initial sensor data that is not associated with an interaction with the computer-assisted device is used for determining the initial registration transform. For example, imaging devices in sensor system 240 of XR system 130 capture images of the one or more portions of the computer-assisted device, and a model target-based technique is used to determine reference frame 124 of computer-assisted device 110 and reference frame 132 of XR system 130 based on the image data. As described, the model target-based technique can use a photogrammetry technique to reconstruct a 3D model of computer-assisted device 110 from the image data, and then match the reconstructed model to a predefined model of computer-assisted device 110 to determine a position and orientation of computer-assisted device 110 relative to XR system 130. In some other examples, determining the initial registration transform includes capturing images of one or more portions of the computer-assisted device on which fiducial markers have been placed. In such cases, the initial registration transform can be computed by comparing markers in the captured images to known positions and orientations of markers on computer-assisted device 110 to determine an overall position and orientation of computer-assisted device 110 relative to XR system 130.

At process 404, one or more interactions between an operator and a portion of a computer-assisted device (e.g., computer-assisted device 110) are detected. The one or more operator interactions can occur at any suitable time after the initial registration transform is determined. In some examples, the one or more operator interactions are detected during the setup and/or ordinary course of use of the computer-assisted device by the operator. In some examples, the one or more operator interactions are detected when the operator is being trained on operating the computer-assisted device. In some examples, the one or more interactions are detected when the operator is performing actions specifically to update the registration transform. For example, during the setup, ordinary course of use, training, and/or registration transform update, one or more prompts can instruct the operator to perform the one or more operator interactions. As another example, an operational state of the computer-assisted device at the time of the one or more interactions or a physical configuration of the computer-assisted device at the time of the one or more interactions (e.g., an initial state or configuration of the computer-assisted device) can be used to determine whether the one or more interactions are being performed by the operator during setup of the computer-assisted device. In such cases, interactions determined to be performed during the setup can be used to update the registration transform. As another example, an operational state of the computer-assisted device at the time of the one or more interactions or an operational state of the XR system at the time of the one or more interactions (e.g., a state of presenting training or other information via the XR system) can be used to determine whether the one or more interactions are being performed by the operator during training to use the computer-assisted device or the ordinary use of the computer-assisted device. In such cases, interactions determined to be performed during the training or ordinary use can be used to update the registration transform. In some examples, the interactions that an operator is prompted to perform can change based on registration transform errors associated with different portions of a computer-assisted device (assuming that a different registration transform has been determined between each such portion and the XR system). For example, when the registration transform error associated with a first portion of a computer-assisted device is greater than the registration transform error associated with a second portion of the computer-assisted device, then the operator can be prompted to perform one or more predefined interactions with the first portion of the computer-assisted device, and vice versa. In such cases, the registration transform errors associated with the first and second portions of the computer-assisted device can be determined in a common reference frame, as described above in conjunction with FIG. 3. As another example, when the registration transform error is greater than a threshold for the entire computer-assisted device and/or portion(s) thereof (e.g., due to drift, movement, sensor inaccuracies, etc.), then the operator can be prompted to perform one or more predefined interactions to update the registration transform. Once again, the registration transform error of the computer-assisted device and/or portion(s) thereof can be determined in a common reference frame, as described above in conjunction with FIG. 3. As further examples, one or more operator interactions can be skipped, repeated, and/or added, or the order of operator interactions can be changed, based on registration transform errors in different portions of a computer-assisted device being greater than error thresholds.

The one or more operator interactions at process 404 can include a single interaction, multiple separate interactions that are separated in time, or a compound interaction in which multiple interactions occur at the same time or in time periods that overlap. Further, an interaction can be a discrete interaction that occurs within a shorter period of time, or be a continuous interaction that spans a longer period of time or involves motion of a link or a joint of the computer-assisted device that is more than the depression of a switch. When an interaction spans a period of time, the interaction can remain the same or change (e.g., from contacting a portion of the computer-assisted device to contacting a different portion or more than one portion of the computer-assisted device) over that period of time. An example of a single interaction is the operator pressing a button on the computer-assisted device. Examples of buttons include a physical button (e.g. a power-on button, an emergency stop button), and a virtual button (a menu selection button, a device control button, etc. displayed on a touchscreen of the computer-assisted device). Another example of a single interaction is tapping one or more finger tips to a link of the computer-assisted device. An example of multiple interactions is a sequence of single operator interactions separated in time that occur within a defined period of time, such as a finger tapping on a link of the computer-assisted device multiple times before a timeout. Multiple interactions can also be separate in space, such as a same or different finger pressing different buttons of the computer-assisted device at different times. An example of a compound interaction is multiple portions of an operator contacting different portions of the computer-assisted device at the same time, such as different feet of an operator stepping on different pedals of a computer-assisted device at a same time or in an time-overlapped manner. Another example of a compound interaction is an operator grabbing on a first link of a computer-assisted device (such as to hold the link stationary in space) while applying force to a second link of the computer-assisted device (such as to move the second link). An example of a continuous interaction is an operator grabbing a portion of the repositionable structure that includes a hand-input sensor and moving the portion of the repositionable structure over a period of time. In such a case, the continuous interaction ends when another predefined event is detected, such as when the operator releases a device control button or is no longer in contact with the computer-assisted device. As shown in the above examples, an operator interaction can comprise the operator interacting with (e.g., touching, grabbing, tapping, moving, pressing, swiping, etc.) a portion of the computer-assisted device that comprises a mechanical input device of the computer-assisted device, or with a virtual input device displayed on or proximate to a portion of the computer-assisted device. Yet another example of an operator interaction is the operator attaching/coupling or detaching/decoupling an object, such as an instrument, a cannula, a drape, etc. to/from the computer-assisted device.

In some embodiments, the one or more operator interactions are detected at process 404 by hand-input sensors, foot-input sensors, and/or other sensors that are included in the computer-assisted device and/or elsewhere in the physical environment. The hand-input and/or foot-input sensors can be buttons, knobs, finger detectors, joysticks, recessed, pedals, among other things. The hand-input and/or foot-input sensors can include touch sensors (e.g., inductive or capacitive touch sensors), contact sensors, pressure sensors, strain gauges, springs, etc. for sensing hand input and/or foot input, respectively.

At process 406, pose information of a portion of the operator that interacts with the portion of the computer-assisted device is determined based on sensor data acquired by a sensor system (e.g., sensor system 240). The pose information of the portion of the operator includes a position of the portion of the operator, an orientation of the portion of the operator, or both during the operator interaction. The pose information can be associated with a point or region of interaction between the portion of the operator and the portion of the computer-assisted device, as described above in conjunction with FIG. 3. In some embodiments, the pose information of the portion of the operator is determined in a reference frame of the XR system (e.g., reference frame 132). In some examples, the portion of the operator is a hand or finger. Additional examples of portions of the operator include multiple fingers, arm, feet, and/or extensions of the foregoing (gloves, shoes, cable, pointer stick), etc. In some embodiments, the pose information of the portion of the operator is determined in up to six DOFs in three-space, including any one or more of x, y, or z position and/or roll, pitch, or yaw orientations. In some embodiments, the pose information includes one or more position (e.g., x, y, and/or z) parameters. In some embodiments, the pose information includes one or more position (e.g., x, y, and/or z) parameters and one or more orientation (e.g., roll, pitch, and/or yaw) parameters.

In some embodiments, the pose information is determined using any technically feasible human pose estimation technique. In some examples, the human pose estimation technique can be a machine learning and/or other computer vision technique that is employed to detect the portion(s) of the operator, or extension(s) thereof, in captured images of the interaction between the portion of the operator and the computer-assisted device. In such cases, the portion of the operator can be modeled/identified in various ways. For example, object segmentation and/or part segmentation techniques can be employed to estimate one or more points and/or regions corresponding to specific parts of a hand of the operator, such as the fingers, finger tips, carpels, meta carpels, palm, and/or wrist in images acquired by image sensors. As another example, the center of a palm position can be estimated by fitting a circle formed by the wrist, and two or more of the most proximal joints of the fingers (e.g., thumb proximal joint and the most proximal joints of the index finger, middle finger, ring finger, and pinky). In some examples, an entire region of contact, represented as a point cloud or mesh, can be estimated, such as the contact between hand(s) of an operator and the computer-assisted device. When a hand pose cannot be estimated or only a partial hand is visible, one or more points and/or regions representative of a fingertip and/or joint, carpel, meta carpel, palm, and/or wrist, foot, etc. can be estimated by fitting a pre-posed full hand to partial data using a partial shape matching technique. In some examples, multiple poses or partial poses can be inferred for multiple portions of the operator that are in view of imaging device(s). Additional computer vision-based human pose estimation techniques are described in Sorriento et al., "Optical and Electromagnetic Tracking Systems for Biomedical Applications: A Critical Review on Potentialities and Limitations," IEEE Rev. Biomed. Eng. 2020:13:212-232 (September 2019), and Oudah et al., "Hand Gesture Recognition Based on Computer Vision: A Review of Techniques," "Hand Gesture Recognition Based on Computer Vision: A Review of Techniques" *Journal of Imaging* 6, no. 8: 73 (2020), which are hereby incorporated by reference herein.

In some examples, the human pose estimation technique can employ sensor data acquired by or with the aid of devices that the operator contacts, such as sensor clothing that the operator wears, objects including sensors that the operator holds, etc. For example, the pose of a hand can be determined using sensor data acquired by a sensory glove. As another example, the pose of a hand can be determined based on how an operator holds a controller device that includes sensors. As another example, a body tracking suit can be employed in conjunction with an optical camera motion capture technique to determine poses of an entire body of an operator or specific portions of the body, such as arms, legs, etc.

In some embodiments, the pose information of a portion of the operator that interacts with the portion of the computer-assisted device is determined based on an eye gaze direction of the user and/or an eye vergence point of the operator and/or the eye gaze direction and/or the eye vergence point is used to supplement pose information of the portion of the operator determined using the other techniques described herein. For example, the operator can look at the portion of the computer-assisted device the operator is interacting with. As another example, the operator can look and interact with a portion of a virtual input device that is displayed on the portion of the computer-assisted device. Thus, the direction of gaze of the operator or the eye vergence point of the operator typically coincides with the portion of the computer-assisted device the operator is interacting with. In some examples, the eye gaze direction is determined based on a pose of one or both eyes of the operator, such as by using one or more imaging or other sensors in XR system 130, such as any of the one or more sensors 240. In some examples, the eye vergence point is determined based on where the eye gaze directions of the eyes of the operator converge. In some examples, when the eye gaze direction and/or the eye vergence point is not focused on the portion of the computer-assisted device the operator, the eye gaze direction and/or the eye vergence point are not considered when determining the pose information of the portion of the operator that interacts with the portion of the computer-assisted device. In some examples, the eye gaze direction and/or the eye vergence point are used in determining the pose information of the portion of the operator that interacts with the portion of computer-assisted device for some types of interactions with the computer-assisted device, such as interactions with a virtual input device displayed on the portion of the computer-assisted device, interactions involving the attaching of an object to the portion of the computer-assisted device, interactions involving the detaching of an object from the portion of the computer-assisted device, and/or the like.

In some examples, the human pose estimation technique also outputs a confidence score associated with the determined pose of the portion of the operator. For example, the confidence score can indicate a probability that the determined portion and/or pose is correct.

At process 408, pose information of the portion of the computer-assisted device that the operator interacted with is determined. The pose information of the portion of the computer-assisted device includes a position of the portion of the computer-assisted device, an orientation of the portion of the computer-assisted device, or both during the operator interaction. In some embodiments, the pose information of the portion of the computer-assisted device is determined in a reference frame of the computer-assisted device (e.g., reference frame 124) and corresponds in time with the operator interaction and with the pose information of the portion of the operator, determined at process 406. In some embodiments, the pose information of the portion of the computer-assisted device is determined at the time of the operator interaction in up to six DOFs in three-space for a rigid body (e.g., a button, switch, portion of screen, part of a rigid link), including any one or more of x, y, and z position and/or roll, pitch, and yaw orientations. When the operator interacts with a portion of a repositionable structure of the computer-assisted device, forward and/or reverse kinematics are used to determine the pose information of the portion of the repositionable structure given known joint locations at the time of the operator interaction. In some embodiments, alternative techniques are used to track the pose information of the portion of a repositionable structure without requiring kinematics. For example, sensors (e.g., a gyroscope) within the portion of the repositionable structure can directly track motion of the portion of the repositionable structure. As additional examples, IMUs, shape sensors, and the like can be used to directly track motion of the portion of the repositionable structure. When the operator interacts with a portion of the computer-assisted device that is not included in a repositionable structure of the computer-assisted device or with a portion of a computer-assisted device that does not include a repositionable structure, pose information of the portion of the computer-assisted device is determined based on a pose of the overall computer-assisted device 110 and a known position and orientation of the portion relative to the overall computer-assisted device 110.

At process 410, the registration transform between the XR system and the computer-assisted device is updated based on the pose information of the portion of the operator, determined during process 406, and the pose information of the portion of the computer-assisted device, determined during process 408. The registration transform that is updated can be an initial registration transform or a previously updated registration transform. The updated registration transform can thereafter be used to render an image including XR content that is displayed by the XR system and viewable by the operator until a new update to the registration transform is determined. In this manner, the XR system uses the latest update of the registration transform when rendering images including XR content. In some embodiments, control module 170 causes the XR system to render such an image, either in response to the one or more operator interactions at process 404 or at a later time. For example, the XR content in the rendered image can provide information for setting up the computer-assisted device, training to use the computer-assisted device, or ordinary operation of the computer-assisted device.

FIG. 5 illustrates process 410 for updating the registration transform between the XR system and the computer-assisted device in greater detail, according to various embodiments. One or more of the processes 502-504 can be implemented, at least in part, in the form of executable code stored on non-transitory, tangible, machine readable media that when executed by one or more processors (e.g., the processor 150 in control system 140) cause the one or more processors to perform one or more of the processes 502-504. In some embodiments, processes 502-504 can be performed by one or more modules, such as control module 170. In some embodiments, additional processes, which are not shown, can be performed.

As shown, at process 502, the pose information of the portion of the operator and/or the pose information of the portion of the computer-assisted device are transformed into a common reference frame using the registration transform that is to be updated. In some embodiments, the common reference frame is a reference frame (e.g., reference frame 124) of the computer-assisted device, a reference frame (e.g., reference frame 132) of the XR system, or any other reference frame to which the pose information of the portion of the operator and/or the pose information of the portion of the computer-assisted device are transformed into. For example, when the common reference frame is the reference frame of the XR system, the pose information of the portion of the computer-assisted device that is determined at process 408 is mapped to pose information in the reference frame of the XR system using the registration transform. As another example, when the common reference frame is the reference frame of the computer-assisted device, the pose information of the portion of the operator determined at process 406 is mapped to pose information in the reference frame of the computer-assisted device using an inverse of the registration transform. In some examples the common reference frame can be chosen based on a procedure being performed, a type of the instrument, a type of the imaging device, operator preference, and/or the like.

At process 504, an error is determined between the pose information of the portion of the operator and the pose information of the portion of the computer-assisted device in the common reference frame. In some embodiments, the error is a difference between the pose information of the portion of the operator and the pose information of the portion of the computer-assisted device in the common reference frame. For example, assume that the pose information of the portion of the operator is mapped to pose information in a reference frame (e.g., reference frame 124) of the computer-assisted device. In such a case, the error is the difference between the mapped pose information of the portion of the operator and the pose information of the portion of the computer-assisted device in the reference frame of the computer-assisted device, determined at process 408. As another example, assume that the pose information of a portion of the computer-assisted device is mapped to pose information in a reference frame (e.g., reference frame 132) of the XR system. In such a case, the error is the difference between the mapped pose information of the computer-assisted device and the pose information of the portion of the operator, determined at process 406.

At process 506, the registration transform is updated based on the error. In some embodiments, the registration transform is updated using a gradient descent or any other suitable technique. In some examples, a gradient descent technique is applied to compute a step for updating the registration transform based on a gradient of the error expressed as a vector. In such cases, the registration transform between the reference frame of the XR system and the reference frame of the computer-assisted device is updated based on the gradient descent step. Over multiple iterations, the gradient descent updates the registration transform so that, if the pose information were mapped to the common reference frame again, the error would be reduced or eliminated. In some examples, the error that is determined at process 504 is filtered by a filtering operation. For example, is some instances, the error determined at process 504 is passed through a frequency-domain filter, such as a Kalman filter, to smooth the transition between previous and current registration transform updates. In some examples, separate filters (e.g., separate Kalman filters) can be used for the rotation and the translation portions of the error depending on a baseline noise level in the determinations of the expected and/or observed geometric properties. In some examples, the filters used to process different degrees of freedom within the translation or rotation portions can also be different.

In some embodiments, the registration transform update is weighted based on the confidence that is assigned to the pose information of the portion of the operator. In some examples, a size of the gradient descent step, described above, is weighted by such a confidence. In some other examples, the registration transform update is only performed when such a confidence has a value that satisfies a predefined threshold, indicating sufficient confidence in the pose information of the portion of the operator. In some examples, the confidence is based on a confidence score output by the same technique that determines the pose information of the portion of the operator, as described above in conjunction with process 406. For example, in such cases, the confidence is based on an ability to infer the pose information of a point or region of interaction when the point or region of interaction is facing away from a sensor system, fully or partially obscured, etc. In some examples, the confidence is based on an amount of agreement between different techniques, such as agreement between a computer vision technique that is used to determine the pose information of the portion of the operator, and a direction the operator is looking that is determined based on a position and orientation of an XR system worn by the operator. In some examples, the confidence is based on an amount of computational error when the pose information of the portion of the computer-assisted device is determined.

Subsequent to updating the registration transform between the XR system and the computer-assisted device, at process 410, method 400 returns to process 402. In some examples, additional operator interaction(s) are detected between the portion of the computer-assisted device when the operator moves the portion of the computer-assisted device over time from one position (and in some cases, orientation) to another by multiple interactions and/or a continuous interaction. In such cases, a time series of the pose information of the portion of the computer-assisted device and of the portion of the operator is determined over multiple time steps. The time series is then used to iteratively update the registration transform between the XR system and the computer-assisted device, according to processes 402-410. In some examples, the operator is prompted to interact again with one or more portions of the computer-assisted device. For example, if the error determined at process 504 exceeds a predefined threshold, indicating that the registration transform is particularly inaccurate, then the operator could be prompted to press a button, grab and move an arm of a repositionable structure, etc. again.

Figure 6:
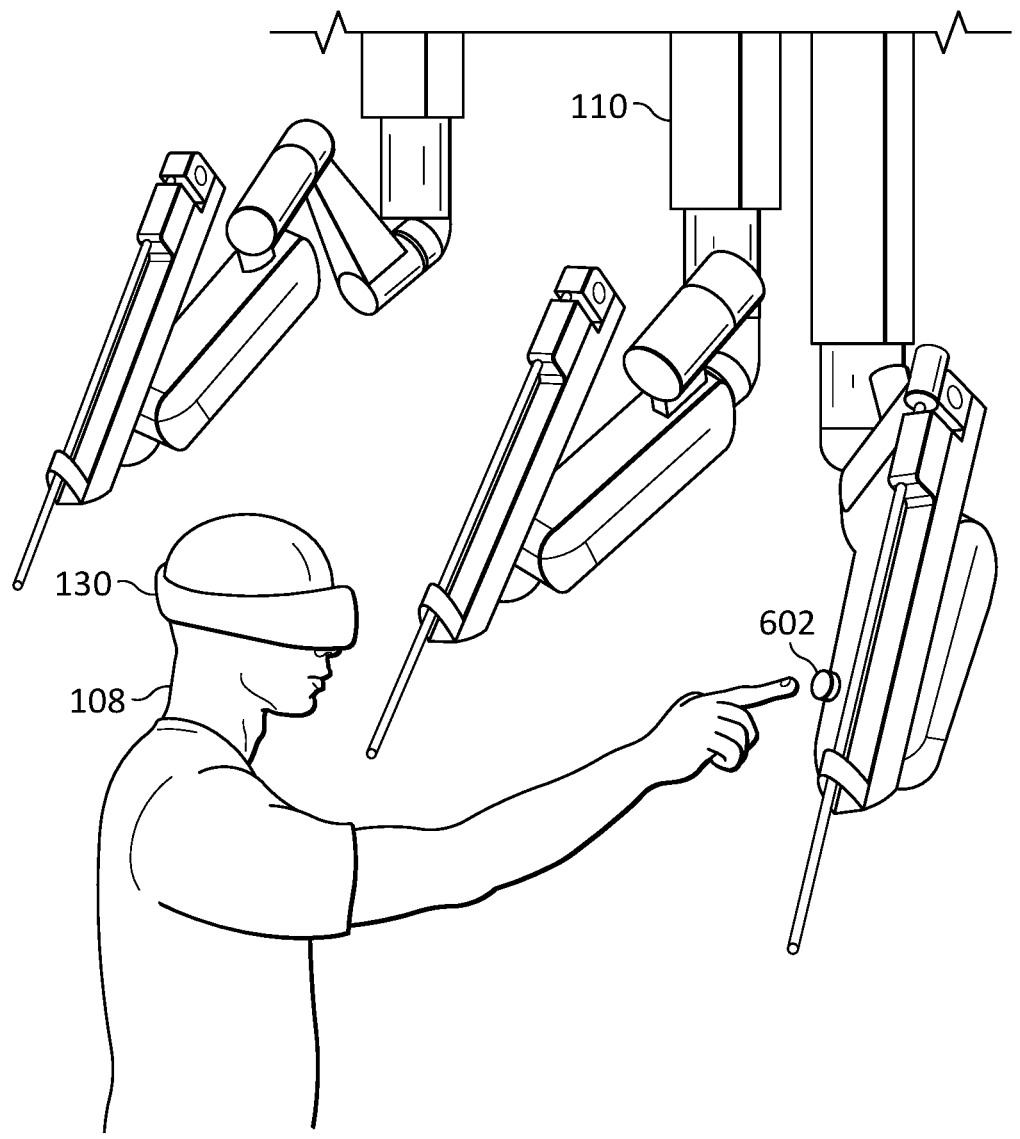
FIG. 6 illustrates an example of an operator interaction for updating a registration transform between an XR system and a computer-assisted device, according to various embodiments.

FIG. 6 illustrates an example of an operator interaction that can be detected at process 404, according to various embodiments. As shown, operator 108 wearing XR system 130 interacts with a button 602 on a repositionable structure of computer-assisted device 110. When the button 602 interaction is detected (process 402), acquired sensor data is used to determine pose information of a finger of operator 108 that presses button 602 (process 406). For example, when the sensor data includes image data, a human pose estimation technique can be used to identify the position (and optionally orientation) of the finger in the image data. In addition, kinematics or non-kinematics techniques are used to determine pose information of button 602 at the time of the button 602 interaction based on known joint locations of the repositionable structure of computer-assisted device 110 (process 408). If the button 602 were on a portion of computer-assisted device 110 other than the repositionable structure, then a pose of the overall computer-assisted device 110 and a known position of button 602 relative to the rest of computer-assisted device 110 could be used to determine the pose information of button 602. A registration transform between XR system 130 and computer-assisted device 110 is updated (process 410) based on the pose information of the finger of operator 108 and the pose information of button 602. As described, updating the registration transform includes mapping the pose information of the finger and/or the pose information of button 602 to a common reference frame using an initial (or previously updated) registration transform (process 502). Then, an error is computed indicating a difference between the pose information of the finger and the pose information of button 602 in the common reference frame (process 504). Thereafter, the registration transform is updated based on the error (process 506).

Figure 7:
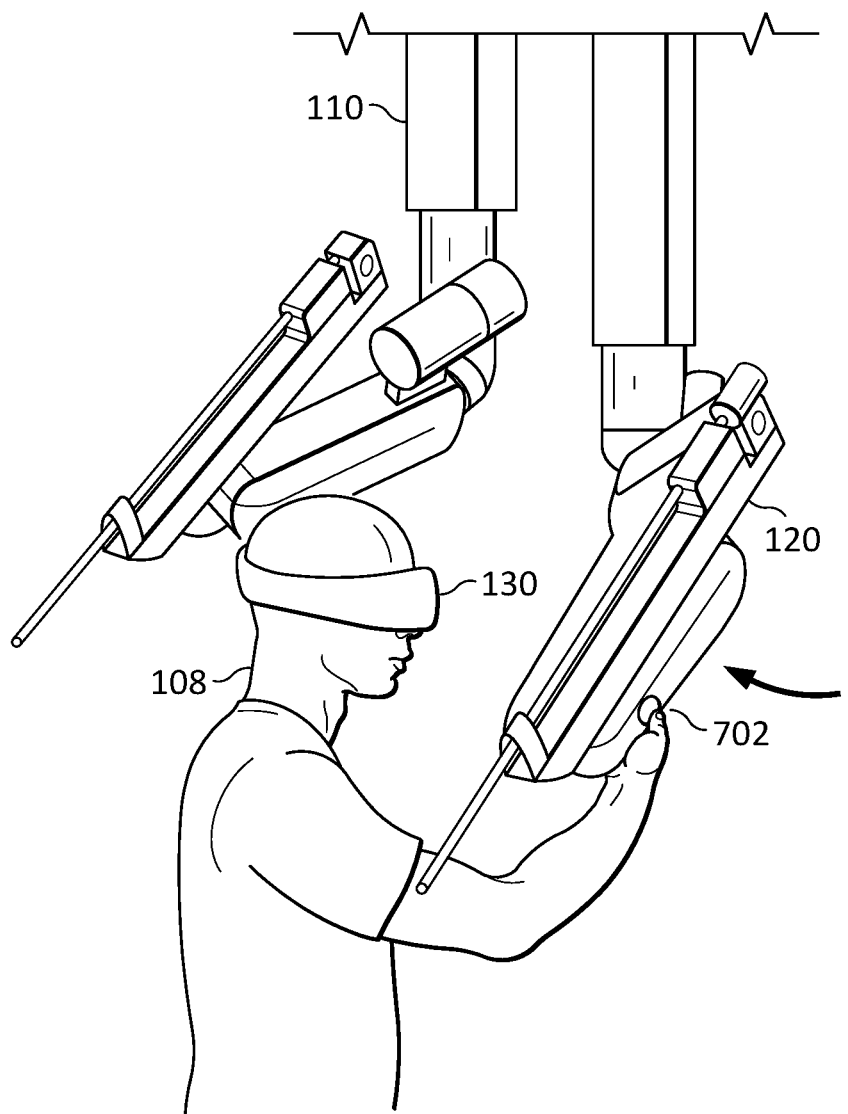
FIG. 7 illustrates another example of an operator interaction for updating a registration transform between an XR system and a computer-assisted device, according to various embodiments.

FIG. 7 illustrates another example of an operator interaction that can be detected at process 404, according to various embodiments. As shown, operator 108 supporting XR system 130 interacts with repositionable arm 120 of computer-assisted device 110 by pressing a touch/contact sensor 702 and grabbing and moving repositionable arm 120. The movement of repositionable arm 120 is detected by joint sensors, shape sensors, and/or the like (process 404). At each time step during the movement of repositionable arm 120, sensor data is acquired and used to determine pose information of a hand of operator 108 (process 406). For example, the sensor data includes image data, and a human pose estimation technique is used to identify the position (and optionally orientation) of the hand, or of individual fingers that are averaged to obtain the position (and optionally orientation) of the hand. In addition, pose information of repositionable arm 120 is determined using kinematics at each time step based on known joint locations of the repositionable structure of computer-assisted device 110 (408). A registration transform between XR system 130 and computer-assisted device 110 is iteratively updated at the time steps. Iteratively updating the registration transform includes mapping the pose information of the hand and/or the pose information of repositionable arm 120 to a common reference frame using an initial (or previously updated) registration transform (process 502). Then, an error is computed that indicates a difference between the pose information of the hand and the pose information of repositionable arm 120 in the common reference frame (process 504). Thereafter, the registration transform is updated based on the error (process 506).

The disclosed techniques can update a registration transform between an XR system and a computer-assisted device. As a result of the updated registration transform, the XR system can display XR content at more accurate positions and/or orientations relative to the computer-assisted device than if the registration transform were not updated. The displayed XR content can include instructive content on how to operate the computer-assisted device, content that provides guidance during operation of the computer-assisted device, and the like.

Some examples of control systems, such as control system 140 may include non-transitory, tangible, machine readable media that include executable code that when executed by one or more processors (e.g., processor 150) may cause the one or more processors to perform the processes of methods 400 and/or 500 and/or the processes of FIGS. 4 and/or 5. Some common forms of machine readable media that may include the processes of methods 400 and/or 500 and/or the processes of FIGS. 4 and/or 5 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. An electronic system comprising:
a computer-assisted device; and
a control system communicably coupled to the computer-assisted device and to a sensor system, the sensor system configured to capture sensor data about an environment external to the computer-assisted device, wherein the control system is configured to:
determine, based on the sensor data, pose information of an operator portion of an operator during one or more interactions between the operator portion and a device portion of the computer-assisted device, the pose information of the operator portion comprising at least one parameter selected from the group consisting of: a position of the operator portion during the one or more interactions and an orientation of the operator portion during the one or more interactions, determine pose information of the device portion during the one or more interactions, the pose information of the device portion comprising at least one parameter selected from the group consisting of: a position of the device portion during the one or more interactions and an orientation of the device portion during the one or more interactions,
update a registration transform between an extended reality (XR) system and the computer-assisted device based on the pose information of the operator portion and the pose information of the device portion, and
cause the XR system to render an image viewable by the operator using the updated registration transform.

2. The electronic system of claim 1, wherein:
the one or more interactions comprises physically coupling an object to the device portion or decoupling the object from the device portion; and
the control system is further configured to identify the device portion based on the sensor data.

3. The electronic system of claim 1, wherein the one or more interactions is a single interaction.

4. The electronic system of claim 3, wherein:
the operator portion comprises one or more fingers of the operator;
the device portion comprises a mechanical button disposed on the computer-assisted device or a touchscreen disposed on the computer-assisted device;
the single interaction comprises the one or more fingers activating the mechanical button, or deactivating the mechanical button, or providing input to the touchscreen; and
the control system is further configured to identify the one or more fingers based on the sensor data.

5. The electronic system of claim 3, wherein the single interaction comprises a continuous interaction.

6. The electronic system of claim 5, wherein:
the computer-assisted device comprises a repositionable structure, the repositionable structure comprising a manipulator arm with a plurality of links coupled by a plurality of joints;
the operator portion comprises a hand of the operator;
the device portion comprises the manipulator arm;
the continuous interaction comprises the hand of the operator moving the manipulator arm; and
the control system is further configured to identify the hand based on the sensor data.

7. The electronic system of claim 1, wherein the one or more interactions comprises a plurality of interactions.

8. The electronic system of claim 7, wherein the plurality of interactions comprises a compound interaction.

9. The electronic system of claim 7, wherein:
the one or more interactions comprises a sequence of interactions; and
to update the registration transform between the XR system and the computer-assisted device, the control system is configured to iteratively update the registration transform based on the pose information of the operator portion and the pose information of the device portion with each interaction included in the sequence of interactions.

10. The electronic system of claim 1, wherein to determine the pose information of the operator portion, the control system is configured to determine:
an eye vergence point of the operator; or
a gaze direction of the operator.

11. The electronic system of claim 1, wherein the pose information of the operator portion includes an eye vergence point of the operator or a gaze direction of the operator when the one or more interactions comprises at least one interaction selected from the group consisting of: the operator interacting with a virtual input device displayed on the device portion, the operator portion attaching an object to the device portion, and the operator portion detaching an object from the device portion.

12. The electronic system of claim 1, wherein the control system is further configured to cause the XR system to render an image that comprises a prompt to the operator to perform the one or more interactions.

13. The electronic system of claim 1, wherein the control system is further configured to determine an initial transform for the registration transform between the XR system and the computer-assisted device based on initial sensor data, the initial sensor data being captured by the sensor system and not associated with the one or more interactions.

14. The electronic system of claim 1, wherein to update the registration transform, the control system is configured to: weight the pose information of the operator portion based on a confidence.

15. The electronic system of claim 1, wherein the control system is further configured to:

qualify an interaction as the one or more interactions based on a specific interaction being performed by the operator to set up the computer-assisted device.

16. The electronic system of claim 15, wherein to qualify the interaction as being performed by the operator to set up the computer-assisted device, the control system is configured to:

use an operational state of the computer-assisted device at a time of the interaction or a physical configuration of the computer-assisted device at the time of the interaction.

17. The electronic system of claim 1, wherein the control system is further configured to: qualify an interaction as the one or more interactions based on the interaction being performed by the operator during training to use the computer-assisted device.

18. The electronic system of claim 17, wherein to qualify the interaction as being performed by the operator during training to use the computer-assisted device, the control system is configured to:

use an operational state of the computer-assisted device at a time of the interaction or an operational state of the XR system at the time of the interaction.

19. The electronic system of claim 1, wherein the one or more interactions comprise a set of predefined interactions, the set of predefined interactions having an order, and wherein the control system is further configured to:

prompt the operator to perform the set of predefined interactions in accordance with the order;

determine a registration transform error associated with the device portion; and adjust the set of predefined interactions based on the registration transform error.

20. The electronic system of claim 19, wherein to adjust the set of predefined interactions based on the registration transform error, the control system is configured to:

add at least one interaction to the set of predefined interactions in response to the registration transform error being larger than an error threshold; or remove at least one interaction from the set of predefined interactions in response to the registration transform error being smaller than an error threshold; or skip a prompt for the operator to perform at least one interaction of the set of predefined interactions; or repeat a prompt for the operator to perform at least one interaction of the set of predefined interactions.

21. The electronic system of claim 19, wherein to adjust the set of predefined interactions based on the registration transform error, the control system is configured to:

change the order of the set of predefined interactions.

22. A method of operating an electronic system comprising a computer-assisted device and a control system communicably coupled to the computer-assisted device and to a sensor system, the sensor system configured to capture sensor data about an environment external to the computer-assisted device, the method comprising:

determining, based on the sensor data, pose information of an operator portion of an operator during one or more interactions between the operator portion and a device portion of the computer-assisted device, the pose information of the operator portion comprising at least one parameter selected from the group consisting of: a position of the operator portion during the one or more interactions and an orientation of the operator portion during the one or more interactions;

determining pose information of the device portion during the one or more interactions, the pose information of the device portion comprising at least one parameter selected from the group consisting of: a position of the device portion during the one or more interactions and an orientation of the device portion during the one or more interactions;

updating a registration transform between an extended reality (XR) system and the computer-assisted device based on the pose information of the operator portion and the pose information of the device portion; and causing the XR system to render an image viewable by the operator using the updated registration transform.

23. The method of claim 22, wherein:

the one or more interactions comprises physically coupling an object to the device portion or decoupling the object from the device portion; and the method further comprises identifying the device portion based on the sensor data.

24. The method of claim 22, wherein:

the operator portion comprises one or more fingers of the operator;

the device portion comprises a mechanical button disposed on the computer-assisted device or a touchscreen disposed on the computer-assisted device;

the one or more interactions comprises the one or more fingers activating the mechanical button, or deactivating the mechanical button, or providing input to the touchscreen; and the method further comprises identifying the one or more fingers based on the sensor data.

25. The method of claim 22, wherein:

the computer-assisted device comprises a repositionable structure, the repositionable structure comprising a manipulator arm with a plurality of links coupled by a plurality of joints;

the operator portion comprises a hand of the operator;

the device portion of the computer-assisted device comprises the manipulator arm;

the one or more interactions comprises the hand of the operator moving the manipulator arm; and the method further comprises identifying the hand based on the sensor data.

26. The method of claim 22, wherein the one or more interactions comprises a plurality of interactions.

27. The method of claim 26, wherein:

the one or more interactions comprises a sequence of interactions; and

updating the registration transform between the XR system and the computer-assisted device comprises iteratively updating the registration transform based on the pose information of the operator portion and the pose information of the device portion with each interaction included in the sequence of interactions.

28. The method of claim 22, wherein determining the pose information of the operator portion comprises determining: an eye vergence point of the operator; or a gaze direction of the operator.

29. The method of claim 22, further comprising causing the XR system to render an image that comprises a prompt to the operator to perform the one or more interactions.

30. The method of claim 22, further comprising: qualifying a specific interaction as the one or more interactions based on the specific interaction being performed by the operator to set up the computer-assisted device; or qualifying a specific interaction as the one or more interactions based on the specific interaction being performed by the operator during training to use the computer-assisted device.

31. The method of claim 22, wherein the one or more interactions comprise a set of predefined interactions, the set of predefined interactions having an order, the method further comprising: prompting the operator to perform the set of predefined interactions in accordance with the order; determining a registration transform error associated with the device portion; and adjusting the set of predefined interactions based on the registration transform error.

32. The method of claim 31, wherein adjusting the set of predefined interactions based on the registration transform error comprises: adding at least one interaction to the set of predefined interactions in response to the registration transform error being larger than an error threshold; or removing at least one interaction from the set of predefined interactions in response to the registration transform error being smaller than an error threshold; or changing the order of the set of predefined interactions; or skipping a prompt for the operator to perform at least one interaction of the set of predefined interactions; or repeating a prompt for the operator to perform at least one interaction of the set of predefined interactions.

33. One or more non-transitory machine-readable media comprising a plurality of machine-readable instructions which when executed by one or more processors are adapted to cause the one or more processors to perform a method of operating an electronic system comprising a computer-assisted device and a control system communicably coupled to the computer-assisted device and to a sensor system, the sensor system configured to capture sensor data about an environment external to the computer-assisted device, the method comprising: determining, based on the sensor data, pose information of an operator portion of an operator during one or more interactions between the operator portion and a device portion of the computer-assisted device, the pose information of the operator portion comprising at least one parameter selected from the group consisting of: a position of the operator portion during the one or more interactions and an orientation of the operator portion during the one or more interactions; determining pose information of the device portion during the one or more interactions, the pose information of the device portion comprising at least one parameter selected from the group consisting of: a position of the device portion during the one or more interactions and an orientation of the device portion during the one or more interactions; updating a registration transform between an extended reality (XR) system and the computer-assisted device based on the pose information of the operator portion and the pose information of the device portion; and causing the XR system to render an image viewable by the operator using the updated registration transform.

34. The one or more non-transitory machine-readable media of claim 33, wherein: the operator portion comprises one or more fingers of the operator; the device portion comprises a mechanical button disposed on the computer-assisted device or a touchscreen disposed on the computer-assisted device; wherein the one or more interactions comprise the one or more fingers activating the mechanical button, or deactivating the mechanical button, or providing input to the touchscreen; and the method further comprises identifying the one or more fingers based on the sensor data.

35. The one or more non-transitory machine-readable media of claim 33, wherein the one or more interactions comprise a set of predefined interactions, the set of predefined interactions having an order, the method further comprising: prompting the operator to perform the set of predefined interactions in accordance with the order; determining a registration transform error associated with the device portion; and adjusting the set of predefined interactions based on the registration transform error.

* * * * *